United States Patent
Olshinka et al.

(10) Patent No.: US 11,259,172 B2
(45) Date of Patent: Feb. 22, 2022

(54) VIRTUAL SIM WITH MULTIPLE MOBILE NETWORK OPERATOR PROFILES FOR OPERATING OVER MULTIPLE WIRELESS IP NETWORKS

(71) Applicants: Telit Technologies (Cyprus) Ltd., Larnaca (CY); Gal Olshinka, Boca Raton, FL (US)

(72) Inventors: Gal Olshinka, Boca Raton, FL (US); Omer Harel, Irus (IL); Elad Aharoni, Be'er Ya'akov (IL); Gaetano Scognamiglio, San Canzian d'Isonzo (IT); Mihai Voicu, Boca Raton, FL (US)

(73) Assignee: TELIT TECHNOLOGIES (CYPRUS) LTD., Larnaca (CY)

(*) Notice: Subject to any disclaimer, the term of this patent is extended or adjusted under 35 U.S.C. 154(b) by 62 days.

(21) Appl. No.: 16/498,225

(22) PCT Filed: Feb. 26, 2018

(86) PCT No.: PCT/US2018/019766
§ 371 (c)(1),
(2) Date: Sep. 26, 2019

(87) PCT Pub. No.: WO2018/182897
PCT Pub. Date: Oct. 4, 2018

(65) Prior Publication Data
US 2021/0105626 A1    Apr. 8, 2021

Related U.S. Application Data

(60) Provisional application No. 62/477,866, filed on Mar. 28, 2017.

(51) Int. Cl.
*H04W 12/42* (2021.01)
*H04W 8/18* (2009.01)
(Continued)

(52) U.S. Cl.
CPC .............. *H04W 8/18* (2013.01); *H04W 4/18* (2013.01); *H04W 12/06* (2013.01);
(Continued)

(58) Field of Classification Search
CPC ....... H04W 12/42; H04W 4/18; H04W 12/06; H04W 88/06
See application file for complete search history.

(56) References Cited

U.S. PATENT DOCUMENTS

| 8,200,736 B2 | 6/2012 | Shi et al. |
| 2007/0207798 A1 | 9/2007 | Talozi et al. |

(Continued)

FOREIGN PATENT DOCUMENTS

| CN | 102395178 | 3/2012 |
| CN | 105282732 | 1/2016 |

(Continued)

OTHER PUBLICATIONS

Richarme, Marc, "The Virtual SIM-A Feasibility Study", Master's Thesis, Apr. 21, 2008, pp. i-xiv, 1-144, XP055199861, Copenhagen.
(Continued)

*Primary Examiner* — Mazda Sabouri
(74) *Attorney, Agent, or Firm* — Pearl Cohen Zedek Latzer Baratz LLP

(57) ABSTRACT

A communication device with a virtual subscriber identify module (SIM) for operating over multiple wireless telephone and internet protocol (IP) networks includes a processor and a virtual subscriber identify module (SIM), which mimics the operation of a physical SIM card. The virtual SIM includes a plurality of mobile network operator (MNO) profiles each MNO profile including a unique telephone network identifier and a unique IP network identifier. The processor is configured to switch mobile network operators for the wireless telephone and internet protocol (IP) net-
(Continued)

works by changing the MNO profile from a first one of the plurality of MNO profiles to a second one of the plurality of MNO profiles simultaneously enabling communicating over a second one of the plurality of mobile telephone networks and a second one of the plurality of IP networks.

24 Claims, 4 Drawing Sheets

(51) Int. Cl.
*H04W 12/062* (2021.01)
*H04W 12/069* (2021.01)
*H04W 4/18* (2009.01)
*H04W 12/06* (2021.01)
*H04W 88/06* (2009.01)

(52) U.S. Cl.
CPC ....... *H04W 12/062* (2021.01); *H04W 12/069* (2021.01); *H04W 12/42* (2021.01); *H04W 88/06* (2013.01)

(56) References Cited

U.S. PATENT DOCUMENTS

| | | |
|---|---|---|
| 2011/0269423 A1 | 11/2011 | Schell et al. |
| 2012/0309374 A1 | 12/2012 | Tagg et al. |
| 2013/0231087 A1 | 9/2013 | O'Leary |
| 2016/0088464 A1 | 3/2016 | Hans |

FOREIGN PATENT DOCUMENTS

| | | |
|---|---|---|
| WO | WO 2010/028302 | 3/2010 |
| WO | WO-2012028302 | 3/2012 |
| WO | WO 2012/085593 | 6/2012 |
| WO | WO 2016/075622 | 5/2016 |

OTHER PUBLICATIONS

Office Action from Chinese Patent Application No. 20188003564046 dated Nov. 24, 2021.

VIRTUAL SIM WITH MULTIPLE MOBILE NETWORK OPERATOR PROFILES FOR OPERATING OVER MULTIPLE WIRELESS IP NETWORKS

CROSS-REFERENCE TO RELATED APPLICATIONS

This application is a National Phase Application of PCT International Application No. PCT/US2018/019766, International Filing Date Feb. 26, 2018, which claims the benefit of U.S. Provisional Patent Application No. 62/477,866, filed Mar. 28, 2017, which are hereby incorporated by reference in their entirety.

FIELD OF THE INVENTION

Embodiments of the present invention relate to a Subscriber Identity Module (SIM) used to communicate with a mobile network operator over a wireless network, and, in particular, to methods and systems for managing a mobile network operator profile stored on a SIM.

BACKGROUND OF THE INVENTION

The Internet of Things (IoT) is an inter-connected network of communication devices (e.g., connected or "smart" devices) with electronics, sensors, software and network connectivity. IoT communication devices may be deployed to monitor technical devices, such as, automobiles, security systems, medical devices including biological implants, home appliances, etc. IoT communication devices may measure and/or gather data about the environment in which they are deployed. The gathered data may then be transmitted over a wireless network, such as, the Internet, and relayed to a monitoring device. The monitoring device may send commands to control the behavior of the network of IoT communication devices, for example, in response to the gathered data.

IoT devices may include a physical Subscriber Identity Module (SIM) card (e.g., hardware) or a virtual SIM (e.g., software) to communicate over a mobile telephone network. A SIM card is an integrated circuit that may include an internal secure memory (often referred to as a "secure element") that stores a unique telephone network identifier such as an international mobile subscriber identity (IMSI) number to uniquely identify and authenticate an IoT device over the mobile telephone network. Similarly, a virtual SIM may also store a unique telephone network identifier and authentication information in the memory of the IoT device, for example, for authenticating the IoT device over a network.

Each SIM card or virtual SIM may be network-specific and stores information to communicate with a specific mobile network operator (e.g., AT&T, Verizon, etc.) over an associated mobile network.

As coverage strength and/or pricing varies between mobile network operators, for example, it may be desirable for mobile devices to switch mobile network operators on-the-fly.

To switch network operators, a user must manually replace a SIM card in order to switch wireless network operators. To switch network operators with a virtual SIM, a network operator may send new profile information including the unique telephone network identifier to change the network (e.g., a new IMSI for a new telephony network and/or a new APN for a new IP data network).

Each network operator typically supports two concurrent networks: a telephony network (e.g., voice/SMS) and a data network (e.g., internet protocol (IP)). However, when a device changes a first one of these networks (e.g., the telephony network) to a new network operator, the other second concurrent network (e.g., the data network) is no longer supported by the new network operator and the (e.g., data) network connection may be interrupted or terminated, for example, causing data sent over that network to be lost. For example, if the unique telephone identifier (e.g., first IMSI) of the telephony network associated with a first mobile network operator (MNO) is initially changed to the unique telephone identifier (e.g., second IMSI) of second MNO, data network communication may be lost since the unique telephone identifier (e.g., first APN) of the first MNO may not have been changed concurrently to the unique telephone identifier (e.g., second APN) of the second MNO. Similarly, if a first APN of the first MNO is initially changed to a second APN of the second MNO, telephony communication is lost since the first IMSI of the first MNO may not have been changed concurrently to the second IMSI of the second MNO.

To resume the second lost or interrupted network, a user may need to manually change the network operator profile data (e.g., a new APN for data networks or a new IMSI for telephony networks) associated with the new network operator. For IoT devices, manually changing the network operator profile data, for example, of hundreds or thousands of IoT devices deployed in the field, may be prohibitively time consuming and expensive. In addition, any delay in reconnecting the second interrupted network may cause further loss of data.

Accordingly, there is a need in the art for methods and systems for mobile devices to seamlessly and simultaneously switch network operators for both the telephony and data networks.

SUMMARY OF THE INVENTION

There is thus provided, in accordance with some embodiments of the present invention, a communication device including a processor and virtual subscriber identify module (SIM) that may be configured to operate over multiple wireless telephone and internet protocol (IP) networks. The virtual SIM may mimic the operation of a physical SIM card. The virtual SIM may include a plurality of mobile network operator (MNO) profiles, each MNO profile in the plurality of MNO profiles may include a unique telephone network identifier enabling communication over a distinct one of a plurality of mobile telephone networks and a unique IP network identifier enabling communication over a distinct one of a plurality of IP networks. The processor may be configured to simultaneously switch mobile network operators for both the wireless telephone and internet protocol (IP) networks by changing MNO profiles from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

In accordance with some embodiments of the present invention, the processor may be configured to switch mobile network operators in response to receiving a request from a remote server.

In accordance with some embodiments of the present invention, the processor may be configured to block a provisioning request to switch only one of the telephone or internet protocol (IP) networks individually, and instead self-initiate a command to switch both of the telephone and internet protocol (IP) networks simultaneously.

In accordance with some embodiments of the present invention, the processor may be configured to block the provisioning request preventing an interruption in service to the other one of the telephone or internet protocol (IP) networks not specified in the provisioning request.

In accordance with some embodiments of the present invention, the processor may be configured the processor receives the request in response to the server determining that the second one of the plurality of telephone or IP networks would provide the communication device with superior connectivity performance than would the first one of the plurality of telephone or IP networks.

In accordance with some embodiments of the present invention, the processor may be configured to receive in the request from the remote server, the second one of the plurality of MNO profiles upon assessing that the second one of the plurality of MNO profiles is not stored in the virtual SIM.

In accordance with some embodiments of the present invention, the request may be encrypted, and the processor may be configured to decrypt the request using a cryptographic key stored in a memory.

In accordance with some embodiments of the present invention, the cryptographic key may be generated from secret information selected from the group consisting of: a soft seed, a hardware identification number seed, and an algorithm.

In accordance with some embodiments of the present invention, the processor may be configured to compare performance of the communication device communicating over the plurality of mobile telephone networks and the plurality of IP networks and to switch mobile network operators upon detecting that the communication device would achieve superior performance operating over the second one of the plurality of MNO profiles than it would operating over the first one of the plurality of MNO profiles.

In accordance with some embodiments of the present invention, the virtual SIM may include files split between a relatively high security memory and a relatively low security memory, wherein the relatively high security memory may be configured for storing private information of the virtual SIM individual to a user or the communication device and the relatively low security memory may be configured for storing public information generic across a plurality of virtual SIMs.

In accordance with some embodiments of the present invention, the relatively high security memory may store information selected from the group consisting of: the plurality of mobile network operator (MNO) profiles comprising the respective unique telephone network identifiers and the unique IP network identifiers, cryptographic keys, APN settings, connectivity parameters and shared secrets.

In accordance with some embodiments of the present invention, the relatively low security memory may store information selected from the group consisting of: configuration logic for switching MNO profiles, SIM tool kit events, and data for managing MNO profile.

In accordance with some embodiments of the present invention, the relatively high security memory may be selected from the group consisting of a secure element, a secure core, and software in an operating system in the communication device.

In accordance with some embodiments of the present invention, the communication device may include a physical SIM card, wherein the processor may be configured to switch between operating the virtual SIM and physical SIM card for connecting over the multiple wireless telephone and internet protocol (IP) networks.

In accordance with some embodiments of the present invention, the processor may be configured to switch between operating the virtual SIM and physical SIM card by using a virtual router.

In accordance with some embodiments of the present invention, the plurality of MNO profiles may include a test SIM profile comprising an inactive subscription to a chosen MNO, which when executed causes the virtual SIM to mimic the operation of a test SIM card with the test SIM profile for validating the communication device on test equipment with communication simulated over the distinct one of the plurality of IP networks associated with the chosen MNO.

In accordance with some embodiments of the present invention, the processor may be configured to encrypt data using a cryptographic security key generated based on a combination of a soft seed derived from a software ID of software operating on the communication device and a hard seed derived from a hardware ID of the communication device hardware to pair the software and hardware.

In accordance with some embodiments of the present invention, the soft seed may be a software seed ID unique to an operating system running on the communication device.

There is further provided, in accordance with some embodiments of the present invention, a server for triggering communication devices to simultaneously switch mobile networks for wireless telephone and internet protocol (IP) networks including one or more memories and one or more processors. The one or more memories may be configured to store, for each communication device, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks. The one or more processors may be configured to generate a request for a communication device to switch mobile network operators for the wireless telephone and internet protocol (IP) networks by triggering the communication device to change an MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

In accordance with some embodiments of the present invention, the one or more processors may be configured to send the request to the communication device to change the MNO profile from the first one of the plurality of MNO profiles to the second one of the plurality of MNO profiles.

In accordance with some embodiments of the present invention, the one or more processors may be configured to determine that the second one of the plurality of telephone or IP networks would provide the communication device with superior connectivity performance than would the first one of the plurality of telephone or IP networks.

In accordance with some embodiments of the present invention, the one or more processors may be configured to send in the request to the communication device, the second one of the plurality of MNO profiles upon assessing that the second one of the plurality of MNO profiles is not stored in the communication device.

In accordance with some embodiments of the present invention, the one or more processors may be configured to encrypt the request using a cryptographic key stored in the one or more memories.

In accordance with some embodiments of the present invention, the cryptographic key may be generated from secret information associated with the communication device selected from the group consisting of a soft seed, a hardware identification number, and an algorithm.

In accordance with some embodiments of the present invention, the one or more processors may be configured to decrypt data received from the communication device using a cryptographic security key generated based on a combination of a soft seed derived from a software ID of software operating in the communication device and a hard seed derived from a hardware ID of the communication device hardware to pair the software and hardware.

In accordance with some embodiments of the present invention, the soft seed may be a software ID unique to an operating system running on the communication device.

There is further provided, in accordance with some embodiments of the present invention, a method for a communication device with a virtual subscriber identify module (SIM) to operate over multiple wireless telephone and internet protocol (IP) networks, the method may include storing in a virtual SIM, which mimics the operation of a physical SIM card, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks. In a processor, mobile network operators for the wireless telephone and internet protocol (IP) networks may be switched by changing the MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

There is further provided, in accordance with some embodiments of the present invention, a method for triggering communication devices to simultaneously switch mobile networks for wireless telephone and internet protocol (IP) networks, the method may include storing in one or more memories for each communication device, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks. In one or more processors, a request may be generated for a communication device to switch mobile network operators for the wireless telephone and internet protocol (IP) networks by triggering the communication device to change an MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

BRIEF DESCRIPTION OF THE DRAWINGS

In order for embodiments of the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
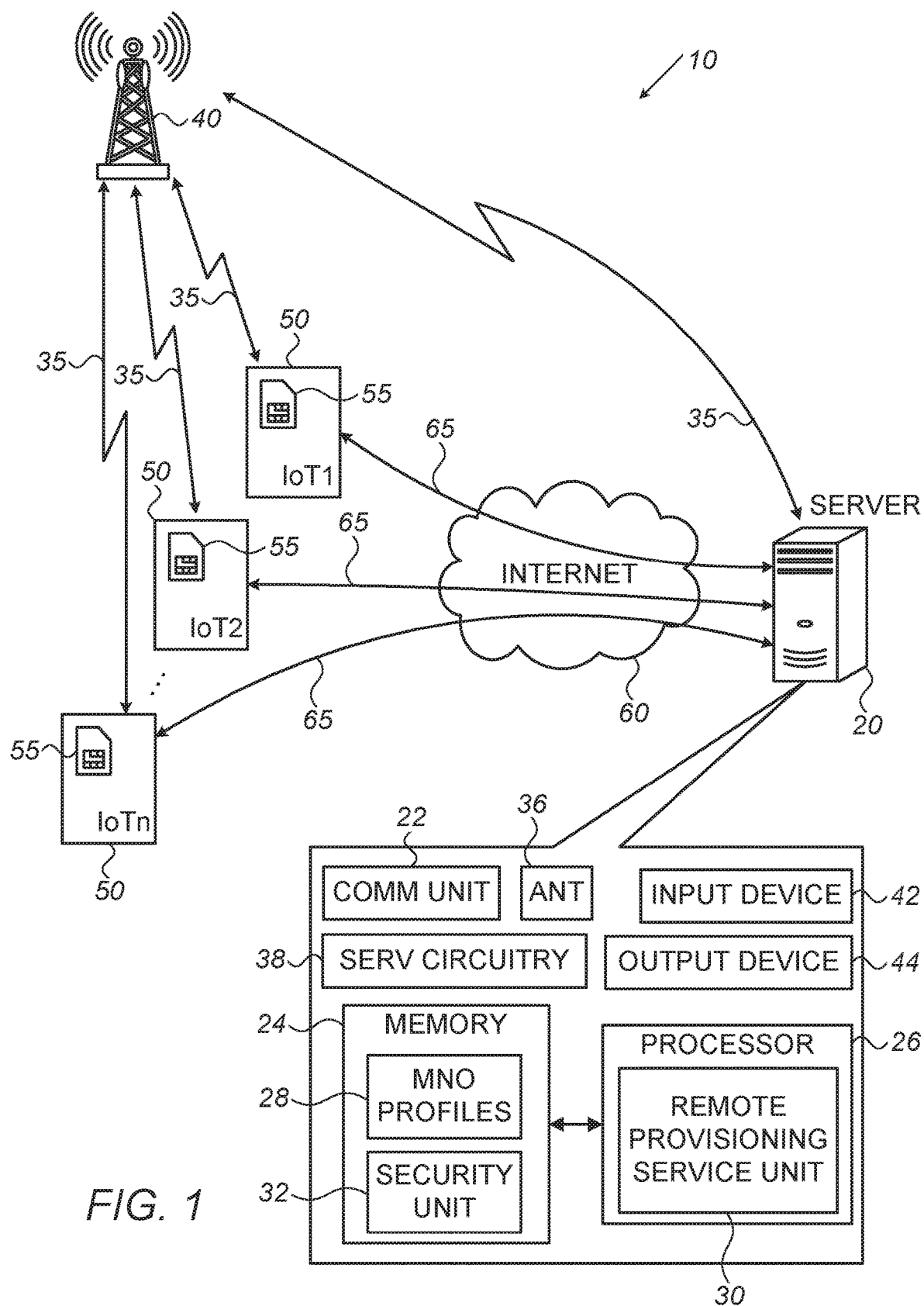
FIG. 1 schematically illustrates a system for managing MNO profiles in one or more communication devices, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

Communication devices, such as Internet of Things (IoT) communication devices or machine-to-machine (M2M) devices, may be configured with sensors and processing elements to collect data reporting on the machines or the environments in which they are deployed. The IoT communication devices, or IoT devices, may communicate with other IoT devices and/or with one or more servers over communication networks, such as the Internet and/or mobile telephone networks.

The IoT communication devices may include a SIM card and/or a virtual SIM which may configure the IoT communication devices to communicate over a mobile network using a mobile network operator (MNO). However, a user or customer, for example, using the IoT devices may decide to change the MNO subscription, for example, due to better quality of service (QoS), signal strength, pricing, roaming options, and/or type of service. When changing the SIM card and/or virtual SIM subscription from a first MNO to a second MNO, the access point name (APN) may need to be changed to ensure that IoT device data communication continues with the IP network associated with the second mobile network operator. The APN is typically network-specific and the APN may not be active until the IoT device registers the APN on the second network.

Typically, when changing the MNO from a first MNO to a second MNO, a technician may need to service each IoT device deployed in the field for the customer and change the APN associated with the second MNO. Moreover, even if the APN may be changed wirelessly over the air, the mobile network operator vendors (e.g., AT&T, Verizon, T-Mobile) typically do not supply the associated APN settings with the information stored on a SIM card and/or a virtual SIM. Therefore, if a request is received by the IoT devices to change the MNO, data communication will be lost since the APN is not simultaneously changed. Similarly, if the network-specific APN settings are changed first, data communication may still be lost since the IoT device may not register on the mobile telephone networks since the unique mobile telephone network identifiers, such as the international mobile subscriber identity (IMSI) number, for example, to uniquely identify and authenticate a user over the mobile telephone network is not simultaneously changed.

Embodiments of the present invention include methods and systems for implementing a virtual SIM with a plurality of MNO profiles to instantly, dynamically and simultaneously change MNOs for both the telephone and IP data networks on-the-fly. Each MNO profile in a plurality of MNO profiles may include a unique telephone network identifier, such as the IMSI number, for example, enabling communication over a distinct one of a plurality of mobile telephone networks and a unique IP network identifier, such as the APN, for example, enabling communication over a distinct one of a plurality of IP data networks.

The virtual SIM may include multiple modes to operate the respective multiple different MNOs, loading a new MNO profile to switch to a new mobile network. In some embodiments, the IoT device processor may be configured to switch MNOs and mobile networks at the request of one of the plurality of MNOs. In one example, a server operating in one of the plurality of mobile networks may communicate with the communication device securely over the network, for example, and send a request, or a command, instructing the communication device to change MNO profiles. The command may be encrypted by a cryptographic key based on shared secrets, or secret information, known only by the IoT device and the server. In some embodiments, a remote server may switch MNOs and mobile networks upon detecting that a new mobile network has superior service than the currently operating mobile network, such as, faster speed, better reception, greater signal strength, lower data rates, etc. In one example, the communication device (e.g., IoT device) or remote servers may request or test performance data from among the plurality of MNOs, compare the data, and select or switch to the MNO that provides the best, or above threshold performance parameters. Performance testing may occur periodically, upon detecting a service interruption, error or data loss, upon roaming, or at the request of a user.

FIG. 1 schematically illustrates a system 10 for managing MNO profiles in a plurality of communication devices 50 operating over a mobile telephone network 35 and an IP network 60, in accordance with some embodiments of the present invention. Server 20 may communicate with a plurality of (n) IoT communication devices 50 denoted $IoT_1$, $IoT_2$, ... $IoT_n$, where n is an integer, for example, over mobile communication network 35 (e.g., mobile telephone network 35) or over IP network 60 via a TCP/IP connection 65. Each of n-IoT communication devices 50 may include a SIM 55 that may be a physical SIM card and/or a virtual SIM.

Server 20 may include one or more processor(s) 26, memor(ies) 24, server circuitry 38, communication unit(s) 22, input device(s) 42, output device(s) 44, and antenna(e) 36. Memory 24 may be configured to store MNO profiles 28 for each of the n-IoT devices to communicate using multiple network operators over mobile communication network 35 via a mobile base station 40. In some embodiments, MNO profiles 28 may be stored in one or more database(s). MNO profiles 28 may include a unique mobile telephone network identifier such as an IMSI number, for a chosen MNO for uniquely identifying and authenticating each of IoT devices 50 over a mobile telephone network 35 and a unique IP network identifier such as a APN associated with the chosen MNO for uniquely identifying and authenticating each of IoT devices 50 over a IP data network 60. Memory 24 may include security unit 32, or a database, for example, for encrypting and decrypting data relayed between server 20 and each IoT device 50 over a communication network (e.g., cellular network 35 and Internet 60). Processor 26 may include a remote provisioning service unit 30 for managing the MNO profiles as described herein.

In some embodiments of the present invention, remote provisioning service unit 30 may be used to manage the MNO profile on IoT device 50. Remote provisioning service unit 30 may access a full ecosystem of mobile network operators worldwide, whose MNO profiles may be stored securely in security unit 32 in memory 24. Security unit 32 may include a set of identifiers and values/keys, such as an authentication key Ki associated with each MNO, for example, which may be used by the MNO to authenticate each of the IoT devices 50 in the communication network associated with a chosen MNO profile. The authenticated IoT devices 50 may then communicate with server 20 over a communication network without compromising the security of the data throughout the lifecycle of IoT device 50.

Each of IoT devices 50 may include secure secret information stored in security unit 32 of remote server 20 and specific to each of IoT devices 50, such as K1 and K2 based on hardware and software seeds for each of the IoT devices. Once the IoT device is authenticated by the MNO, this secure secret information may be used by the each of IoT devices 50 to secure the data stored locally on the IoT device, and also used in computing cryptographic keys for communicating data between IoT device 50 and remote server 20 of the IP network. IoT device 50 may communicate data over mobile telephone network 35 via base station 40, for example, using 2G, 3G, 4G and/or long term evolution (LTE) cellular data standards. Similarly, IoT device 50 may communicate data over internet 60, for example, using TCP/IP connection 65. In either case, for a chosen MNO, the IoT device 50 may need to be authenticated over the network of the chosen MNO and the appropriate APN settings associated with the chosen MNO to enable data communication between IoT device 50 and remote server 20 using the chosen MNO.

Figure 2:
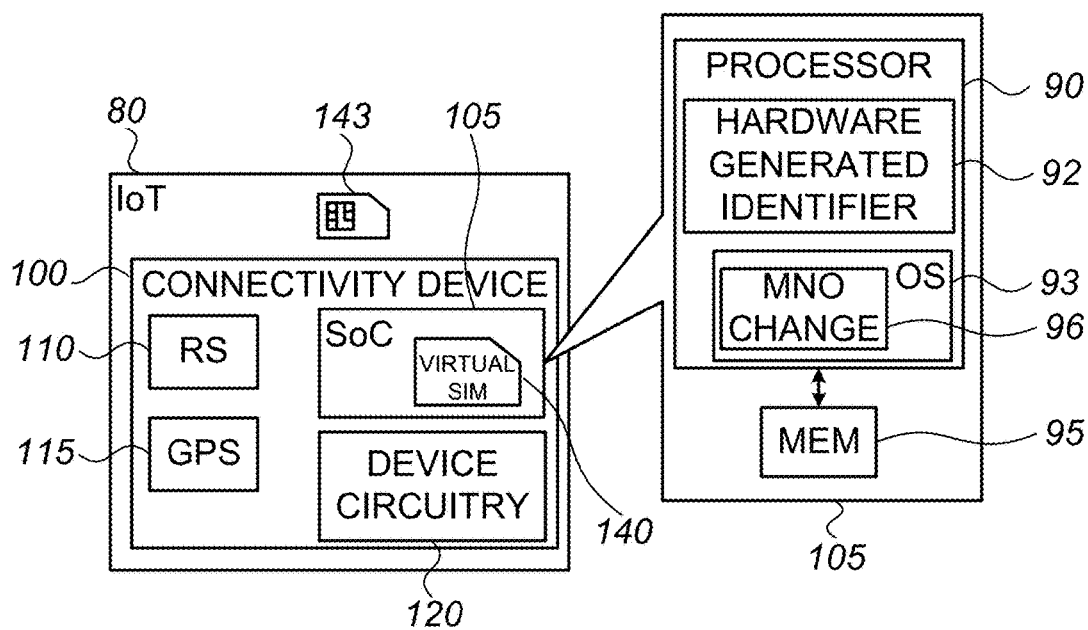
FIG. 2 schematically illustrates a communication device, such as an IoT device, with a connectivity device, in accordance with some embodiments of the present invention.

FIG. 2 illustrates an IoT device 80 with a connectivity device 100, in accordance with some embodiments of the present invention. IoT device 80 may be one of the plurality of IoT devices 50 shown in FIG. 1. Connectivity device 100 may include a system-on-chip (SoC) 105, a radio stack (RS) 110, a global positioning system (GPS) 115, and circuitry 120. In some embodiments, IoT device 80 may include a physical SIM card 143. SoC 105 may include a processor 90 with a hardware generated identifier (HGI) 92, a memory 95, and a virtual SIM 140. HGI 92 may be used as a shared secret stored in memory 95 (e.g., HGI 92) for generating cryptographic keys for encrypting/decrypting data relayed between IoT device 80 and server 20 over a communication network. HGI 92 may include proprietary generated identifiers based on the unique attributes of the hardware components. HGI 92 of multiple IoT devices 50 communicating in system 10 may be stored in memory 24 of server 20. Processor 90 may also execute software 96 (e.g., software routines for changing the MNO) residing in an operating system (OS) 93 for changing the MNO profile from a first MNO profile to a second MNO profile. Operating system 93 may be stored in memory 95 and uploaded to processor 90 for execution. OS 93 may include firmware for controlling the hardware in connectivity device 100, which the second (connectivity) vendor may install on connectivity device 100. The firmware may be stored in memory 95, for example.

In some embodiments of the present invention, a dedicated agent may reside in OS 93 controlling connectivity device 100. For example, virtual SIM 140 may be implemented as operating system 93. Processor 90 may execute software 96 residing in an operating system 93 associated with virtual SIM 140 to mimic the operation of a physical SIM card. Software 96 resident in OS 93 of virtual SIM 140, when executed, may simultaneously switch mobile network operators for both the wireless telephone and internet protocol (IP) networks.

Processor 26 and/or processor 90 may include one or more processing units, e.g. of one or more computers. Processor 26 and/or processor 90 may be configured to operate in accordance with programmed instructions stored in memory 24 and memory 95, respectively. Processor 26 and processor 90 may be respectively configured to execute applications for managing MNO profiles in communication devices 50 via server 20.

Processor 26 may communicate with output device 44. For example, output device 44 may include a computer monitor or screen. Processor 26 may communicate with a screen of output device 44 to display information to a user of system 10 for managing MNO profiles. In another example, output device 14 may include a printer, display panel, speaker, or another device configured to produce visible, audible, or tactile output.

Processor 26 may communicate with input device 42. For example, input device 42 may include one or more of a keyboard, keypad, or pointing device for enabling a user to input data or instructions for operation of processor 26.

Processor 26 and processor 90 may communicate with memory 24 and memory 95, respectively. Memories 24 and 95 may each include one or more volatile or nonvolatile memory devices, such as a flash memory. Memories 24 and 95 may be utilized to store, for example, programmed instructions for operation of processors 26 and 90, respectively, data or parameters for use by processors 26 and 90 during operation, or results of operation of processors 26 and 90.

In operation, processors 26 and 90 may execute a method for managing MNO profiles both in multiple communication devices 50 and/or in remote server 20 via a communication network.

In some embodiments of the present invention, using connectivity device 100 in IoT device 80 as shown in FIG. 2 may be useful when a first vendor, such as an enterprise customer, for example, manufactures IoT device 80 to perform specific functions, such as gathering data, for example, about the environment in which the IoT devices are deployed. The first vendor may not be interested in managing the connectivity of the plurality of IoT devices 50 over multiple mobile network operators defined by the respective plurality of MNO profiles.

A second vendor may provide connectivity services for the first vendor for the plurality of IoT devices 50 each using connectivity device 100 to communicate with server 20 over multiple mobile network operators, for example. The second vendor may provide the pin-out of connectivity device 100 to the first vendor, which may be used by the first vendor for integrating the connectivity device 100 into IoT device 50 during assembly. Server 20 may be managed by the second vendor and may subsequently provide a method for the first vendor to access IoT devices 50. The second vendor may use SoC 105, radio stack (RS) 110, and/or GPS 115 on IoT device 50 to change MNO provider and communication frequencies, for example, using server 20.

In some embodiments of the present invention, the second vendor may upload OS 93 stored in the memory during production of each connectivity device 100, which may be further used by each of the plurality of IoT devices 50. OS 93 may be used to control all or part of the connectivity functions described herein in managing the MNO profiles. OS 93 may include a software seed also referred to as a soft seed, which may be used as one of the shared secrets in creating encryption/decryption keys used when communicating between the server and the IoT device over the mobile communication network. The second vendor may include a secret algorithm (e.g., a vendor defined algorithm) as one of the shared secrets, or secret information, also used in creating the encryption/decryption keys.

In some embodiments of the present invention, SoC 105, radio stack (RS) 110, GPS 115, and/or circuitry 120 may be directly implemented in IoT device 80 to perform the functions described herein, and not use separate connectivity device 100 as shown in FIG. 2.

In some embodiments of the present invention, the second vendor may manage subscriptions of multiple mobile network operators which may be used by the first vendor. By the use of virtual SIMs deployed on the IoT devices, server 20 may generate and send a request to the IoT devices to change the MNO profile of one or more IoT devices chosen from the multiple subscriptions managed by the second vendor. Using these flexible subscription management schemes, the IoT devices of the first vendor may not be subject to an MNO lock (e.g., locking the first vendor to a particular mobile network operator). Using these flexible subscription management schemes, the IoT devices may be deployed in countries where roaming is not permitted. For example, in some countries such as Brazil, in-bound roaming may be limited to a few months after which a foreign MNO is blocked and can no longer subscribe to a local network. However, having the second (connectivity) vendor managing the MNO profiles by use of virtual SIMs on the IoT devices, the server may instruct IoT devices to change from the blocked MNO to a different MNO.

Each of the IoT devices may communicate over mobile telephone network 35 by using a telephone number set by the mobile network operators. The data stored on SIM card 143 and/or virtual SIM 140 on each IoT device 50 may be used as a token that permits IoT device 50 to authenticate in mobile communication network 35. Physical SIM card 143 and/or virtual SIM 140 may hold shared secrets used for encrypting and decrypting data sent between IoT device 50 and server 20. However, the APN may be simultaneously changed to enable data communication over IP network 60 associated with the APN of the chosen MNO profile.

Embodiments of the invention may provide virtual SIMs with multiple MNO profiles, each MNO profile including MNO subscription and APN settings, which are used to simultaneously configure each IoT device, thereby removing these limitations by providing scalability and interoperability. Connectivity device 100 may provide lifecycle management of the IoT devices and hardware compatibility of IoT devices 50 with network standards particularly when implemented by managing multiple MNO profiles using virtual SIMs. For example, server 20 may send a request to one or more IoT devices 50 over a communication network to change the MNO profile. Server 20 may be used to manage the association between the virtual SIM and telephone number of IoT device 80. Moreover, if a new MNO operator wants to be added to the list of MNOs provided by the plurality of IoT devices 50 used in system 10, the new MNO profile can be stored in MNO profile database 28 (e.g., subscription database). The new MNO profile may be communicated to each of the IoT devices already deployed in the field over the communication network, uploaded to operating system 93 controlling IoT device 80, and stored in memory 95. The new MNO profile may be used by the IoT device to communicate over the communication network with server 20 and/or with the vendor deploying and using the IoT devices for specific functions.

In some embodiments of the present invention, managing the MNO profiles may include managing the mobile telephone network (e.g., the telephone number of the IoT device) and the access point name (APN) both associated with a mobile network operator to simultaneously enable communication over both the mobile telephone network and IP networks. SIM cards and/or virtual SIM 55 may be configured to simultaneously enable communication over the telephone and IP networks configured by the APN for a particular MNO. IoT device 80 may communicate over a mobile communication network after being configured with the APN settings.

An individual consumer using a cellular phone with a SIM card associated with a particular mobile network operator may receive an APN associated with that MNO. However, an enterprise customer (e.g., the first vendor) operating hundreds of IoT devices deployed in the field, for example, does not want its IoT device data traffic to roam into public IP networks. The APN and associated settings may be allocated by the MNO for enterprise customers requesting an APN. For example, AT&T may allocate a dedicated APN for Ford Motors, such as attz.ford1.com, for use in IoT devices used in Ford vehicles. The APN settings may include a username/password, proxy settings, etc., for example. Furthermore, AT&T may apply this APN to an authorized range of IMSI numbers to be used by the IoT devices deployed in Ford vehicles. AT&T and Ford may create a firewall tunnel between their networks such that vehicles with IoT devices using the authorized range of IMSI numbers may access Ford's network using the APN attz.ford1.com.

In some embodiments of the present invention, server 20 may send a request to all of IoT devices 50 to switch MNOs from a first MNO to a second MNO. Server 20 may have assessed, for example, that the second MNO has a better quality of service (QoS) than the first MNO.

In some embodiments of the present invention, one IoT device among the plurality of IoT devices 50 may assess that the second MNO profile has a better QoS and may report the assessment to server 20, which may trigger server 20 to send a request to all of IoT devices 50 to switch MNOs. In some embodiments of the present invention, the MNO profiles for all of the IoT devices may be switched individually to an MNO profile with the best QoS for each individual IoT device among the plurality of IoT devices.

Figure 3:
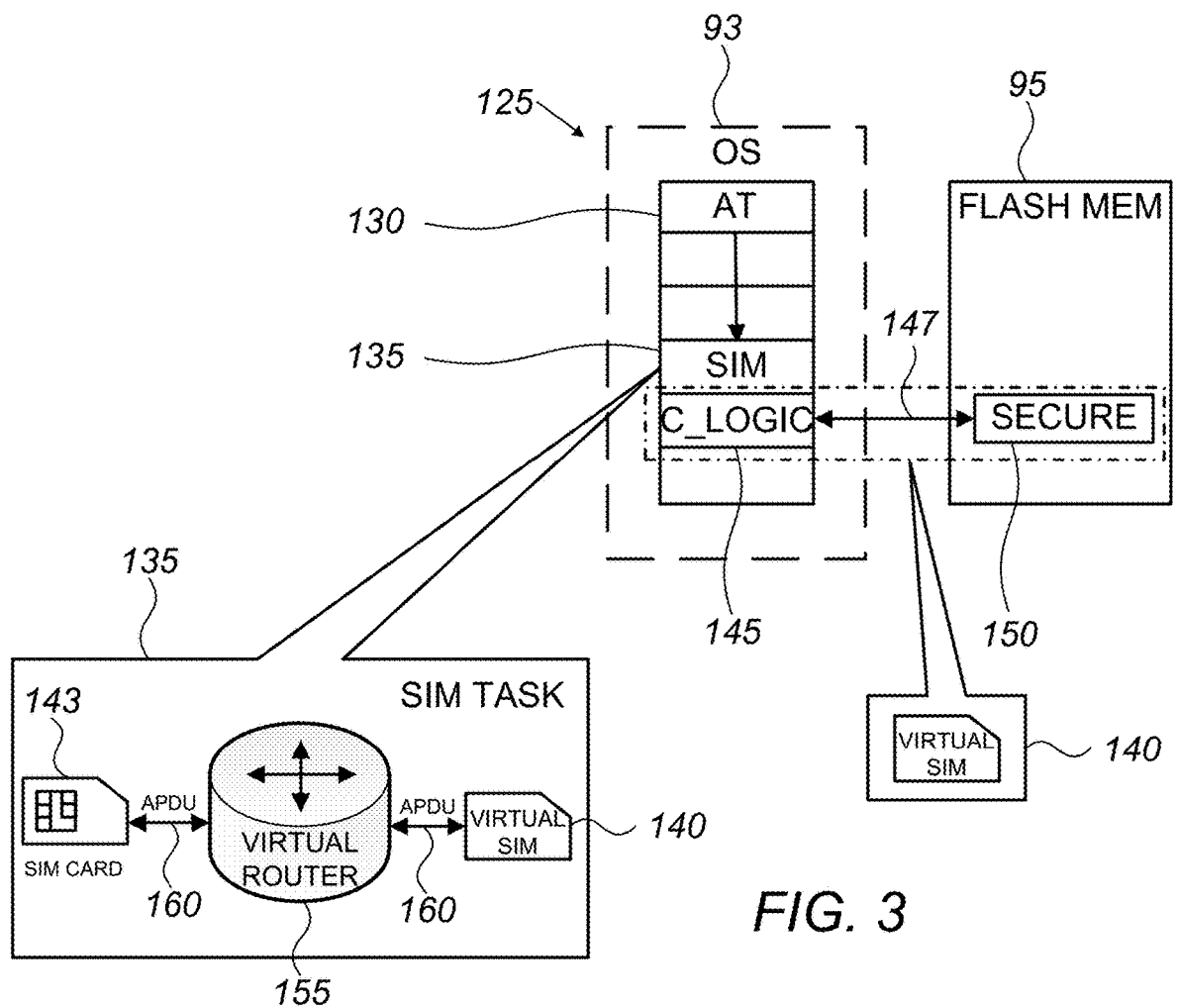
FIG. 3 schematically illustrates tasks executed by a system-on-chip (SoC), in accordance with some embodiments of the present invention.

FIG. 3 schematically illustrates tasks 125 executed by system on chip 105, in accordance with some embodiments of the present invention. Tasks 125 may include layers in OS 93 that performs certain functions. Processor 90 may run an operating system (OS) 93 to execute tasks 125. SoC 105 in connectivity device 100 may receive requests from server 20 over the communication network for controlling the behavior of virtual SIM 140. In some embodiments, the request may include attention (AT) commands. The AT commands may be received by IoT device 80 and executed by processor 90 as AT task 130. AT commands may be used to control the behavior of virtual SIM 140 either remotely or locally, and/or to cause software routine 96 to change the MNO profile fetched from the virtual SIM. AT commands may be standardized as defined, for example, in the European Telecommunications Standards Institute (ETSI) GSM 07.07 typically used, for example, by mobile telephones and machine-to-machine devices. AT commands may be used to control a modem in SoC 105, for example, in connectivity device 100. However, the AT commands may be customized which may be used to control the behavior of virtual SIM 140.

In some embodiments of the present invention. OS 93 may be used to authenticate server 20 which may send the AT commands to IoT device 80. AT commands may be relayed to perform a SIM task 135. SIM task 135 may be used to control communication between the SIM (e.g., virtual SIM 140 and/or physical SIM 143) and the modem. SIM task 135 may include a virtual router 155 that may select whether to use physical SIM card 143 or virtual SIM 140 in a hybrid virtual-physical SIM mode.

An Original Equipment Manufacturer (OEM), or the first vendor, may want variability in the IoT devices which may include legacy physical SIM cards (e.g., SIM card 143)

already deployed in the field. A virtual SIM may be added to the IoT device, for example, by a firmware upgrade. Additionally, the first vendor using the connectivity service vendor (e.g., the second vendor) may decide to terminate services with the connectivity vendor. The OEM may port-out from the second vendor by inserting a physical SIM card into each IoT device deployed in the field. Nevertheless, virtual router 155 may be used to switch between MNO profiles stored in virtual SIM 140 and physical SIM card 143.

In some embodiments of the present invention, processor 90 may be configured to instruct virtual router 155 to switch between operating virtual SIM 140 and physical SIM card 143 for connecting over the multiple wireless telephone and internet protocol (IP) networks.

In some embodiments of the present invention, processor 90 may be configured to switch between operating virtual SIM 140 and physical SIM card 143 by using virtual router 155.

In some embodiments of the present invention, the programs resident in OS 93 may be used to translate the AT commands in AT task 130 to standard application protocol data unit (APDU) 160. APDUs 160 may be used by SIM card 143 or virtual SIM 140 to exchange information with connectivity device 100. Physical SIM card 143 may include standard electrical ports, for example, for voltage, ground, clock, reset, and/or I/O. The I/O port may exchange information with the APDUs and may be used by a mobile phone, for example, to communicate with the SIM card. The dedicated agent may be used to translate AT commands to APDUs.

In some embodiments of the present invention, AT commands may be virtualized and sent by server 20 to the IoT device over a communication network, such as in an SMS network or a TCP/IP network. For example, the AT commands may be bundled into an SMS message to the IoT device. The SMS message may then be sent from the server to the IoT device over a mobile telephone communication network. In some embodiments, the AT commands may be sent by the server to the IoT device over a serial port connection.

In some embodiments of the present invention, the AT commands may include the information as to which MNO profile that IoT device 80 may switch to. Upon receiving the AT commands, MNO change software routine 96 resident in OS 93 may instruct processor 90 to fetch the connectivity and shared secret information from virtual SIM 140 and/or physical SIM card 143 and to simultaneously change the IMSI and APN settings to enable IoT device 80 to operate on the new MNO.

In some embodiments of the present invention, virtual SIM 140 may be partitioned into two objects for implementation managed by a configuration logic task (C_LOGIC) 145 in task stack 125. The two objects may include a secure file system 150 implemented, for example in flash memory 95 and/or a dedicated secure core in processor 90 of IoT device 80, and configuration logic, or a configuration logic file system managed by configuration logic task 145 running in OS 93. Configuration logic task 145 may access secure file system 150 using a vendor defined protocol 147. Virtual SIM 140 may include files split between a relatively high security memory (e.g., secure file system 50) and a relatively low security memory (e.g., C_LOGIC 145). The relatively high security memory is configured for storing private information of the virtual SIM individual to a user or the communication device and the relatively low security memory is configured for storing public information generic across a plurality of virtual SIMs. The relatively high security memory resides in a dedicated secure element (e.g., secure file system 150 in memory 95)

In some embodiments of the present invention, secure file system 150 may store keys, connectivity parameters, and MNO profiles for IoT device 50 to communicate with a mobile network operator including, for example, an IMSI and APN associated with each MNO profile. Secure file system 150 may reside in any medium and is not limited to flash memory 95 as shown in FIG. 3. Secure file system 150 has the secret information, or shared secrets, associated with IoT device 50. An image of the secret information, or shared secrets, may also be stored in memory 24 of server 20 insecurity unit 32. For example, an image of MNO profile database 28 in server 20 may be loaded to memory 95 in connectivity device 100. The shared secrets may be loaded and stored in secure file system 150 during production, or sent to IoT device 50 deployed in the field via a secure (e.g., encrypted) communication network.

In some embodiments of the present invention, the configuration logic file 145 system running in OS 93 may include data for management of the MNO profile that is not secure, sensitive, or individual to a user or device. The configuration logic file may store configuration logic for switching MNO profiles, SIM tool kit events, and data for managing MNO profile. The configuration logic file data may be the same in all n-IoT devices 50, whereas the secure file system 150 is typically unique and different for each of the n-IoT devices 50. A SIM card may include a token with embedded secure secrets and configuration logic.

In some embodiments of the present invention, the relatively high security memory stores information is selected from the group consisting of: the plurality of mobile network operator (MNO) profiles comprising the respective unique telephone network identifiers and the unique IP network identifiers, cryptographic keys, APN settings, connectivity parameters and shared secrets.

In some embodiments of the present invention, the relatively low security memory stores information is selected from the group consisting of: configuration logic for switching MNO profiles, SIM tool kit events, and data for managing MNO profile.

In some embodiments of the present invention, the relatively high security memory resides in a secure element, a secure core, or software in an operating system the communication device (e.g., configuration logic in the virtual SIM). In some embodiments, the secure element may include separate memory block, for example, in memory 95 or a physically separate dedicated device in IoT device 80. In some embodiments, the secure core may include separate cores with multicore processors (e.g., processor 90).

In some embodiments of the present invention, hardware generated identifier (HGI) 92 used in IoT device 80 may be used as a secure secret (e.g., a hardware identification number seed) in the generation of cryptographic keys used by connectivity device 100. Access to the secure area of the flash memory by rogue cloning of the secure area may be prevented by tying the generation of the cryptographic keys to the hardware by using HGI 92. During production of connectivity device 100, for example, HGI 92 may be combined with cryptographic seeds to create the cryptographic keys using algorithms implemented in the firmware of device 100.

In some embodiments of the present invention, processor 90 may be configured to encrypt data using cryptographic security keys generated based on a combination of a soft seed derived from a software ID of the IoT device operating system, a unique production key and a hard seed derived from a hardware ID (e.g., HGI 92) of the communication device hardware to pair the firmware and hardware. In some embodiments, the soft seed may be software seed identifiers unique to OS 93. In other embodiments, the soft seed may also include software seed identifiers unique to firmware loaded into connectivity device 100 in production by the second vendor.

By tying the cryptographic keys to be generated by both the software and hardware identifiers, a rogue device cannot spoof the operating system software without possessing the hardware identifiers of the mobile device 50, and likewise cannot spoof the hardware of the mobile device 50 without possessing software identifiers.

Figure 4:
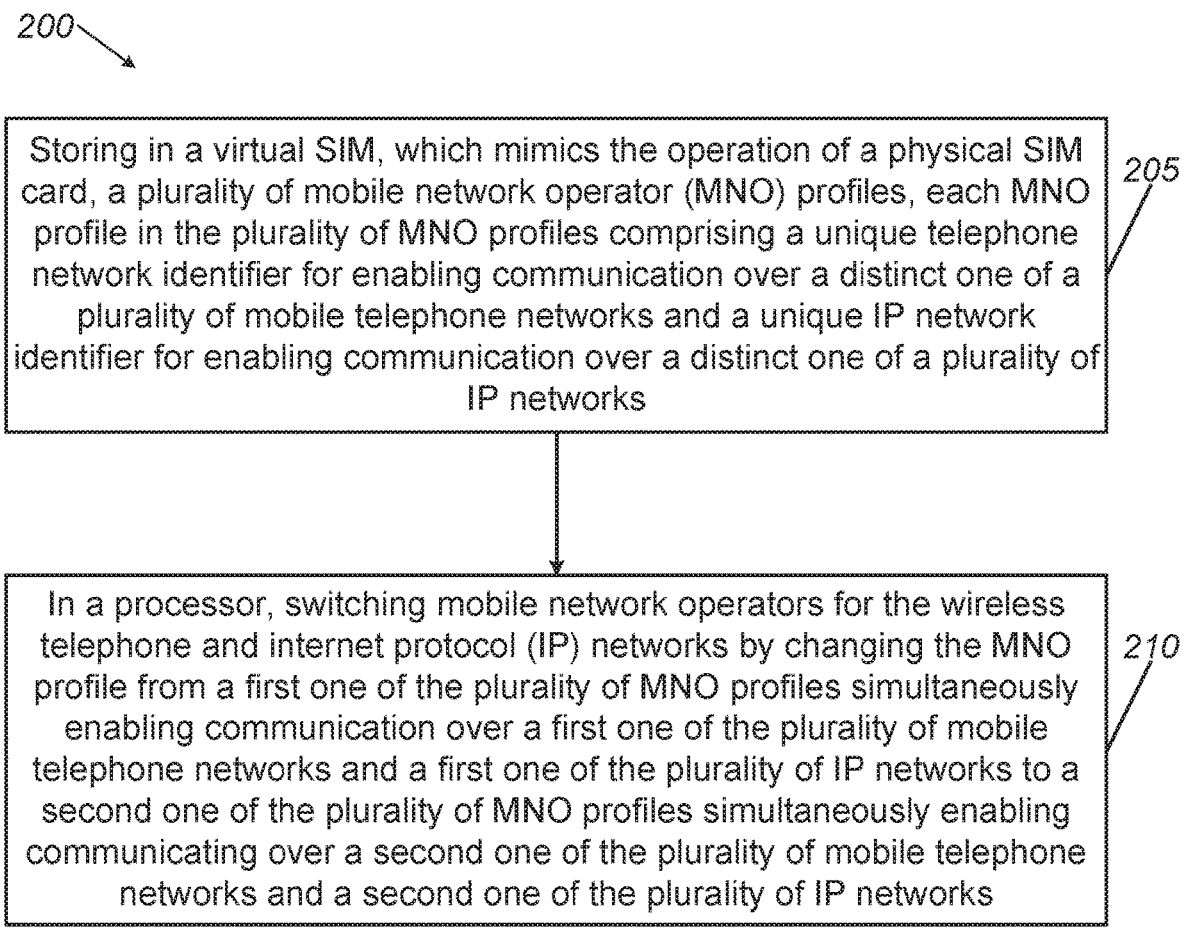
FIG. 4 is a flowchart depicting a method for a communication device with a virtual subscriber identity module (SIM) to operate over multiple wireless telephone and internet protocol (IP) networks, in accordance with some embodiments of the present invention.

FIG. 4 is a flowchart depicting a method 200 of operating a communication device with a virtual subscriber identify module (SIM) over multiple wireless telephone and internet protocol (IP) networks, in accordance with some embodiments of the present invention. In the example of FIG. 4, method 200 may be executed by processor 90 of IoT device 80 in system 10 for managing MNO profiles in communication devices 50 over mobile communication network 35 by a server 20.

Method 200 may include storing 205 in a virtual SIM, which mimics the operation of a physical SIM card, a plurality of mobile network operator (MNO) profiles, each MNO profile in the plurality of MNO profiles comprising a unique telephone network identifier (e.g., IMSI) for enabling communication over a distinct one of a plurality of mobile telephone networks and a unique IP network identifier (e.g., APN) for enabling communication over a distinct one of a plurality of IP networks.

Method 200 may include switching 210 mobile network operators for the wireless telephone and internet protocol (IP) networks by changing the MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

In some embodiments of the present invention, method 200 may include switching 210 mobile network operators in response to receiving a request from a remote server.

In some embodiments of the present invention, the received request may be encrypted and method 200 may include decrypting the request using a cryptographic key stored in memory 95. The cryptographic key may be selected from the group consisting of: a soft seed, a hardware identification number seed (e.g., derived from HGI 92), and an algorithm. The algorithm may use, for example, authentication key $K_i$ associated with the chosen MNO.

In some embodiments of the present invention, method 200 may include receiving the request in response to the remote server determining that the second one of the plurality of telephone or IP networks would provide the communication device with superior connectivity performance than would the first one of the plurality of telephone or IP networks.

In some embodiments of the present invention, remote server 20 may send a request to IoT device 80 to change the MNO to a chosen MNO defined by a chosen MNO profile. However, server 20 may assess that the chosen MNO profile is not stored in memory 95 of IoT device 80. Server 20 may fetch the chosen MNO profile stored in MNO profile database 28 and add the chosen MNO profile to the request sent to IoT device 80 to upload the chosen MNO profile in the request to memory 95. The request may instruct IoT device 80 (e.g., processor 90) to switch MNOs to the chosen MNO using the uploaded chosen MNO profile. Accordingly, method 200 may include receiving in the request from remote server 20, the second one of the plurality of MNO profiles upon assessing that the second one of the plurality of MNO profiles is not stored in the virtual SIM (e.g., in a MNO database stored in memory 95).

In some embodiments of the present invention, server 20 may compare performance of the communication device communicating over the plurality of mobile telephone networks and the plurality of IP networks and may send a request to the communication device to switch mobile network operators upon detecting that the communication device would achieve superior performance operating over the second one of the plurality of MNO profiles than it would operating over the first one of the plurality of MNO profiles.

In some embodiments of the present invention, server 20 may encrypt the request, or command, using cryptographic keys generated from the one of the plurality of secret information, or shared secrets associated with the one of the plurality of communication devices.

In some embodiments of the present invention, communication device 80 may retrieve the second MNO profile from the command upon assessing that the second MNO profile is not stored in the MNO profile database in the virtual SIM (e.g., stored in a database in memory 95).

In some embodiment of the present invention, communication device 80 may decrypt the command by using cryptographic keys generated from the secret information.

Communication service providers, which operate mobile networks, may send configuration commands to communication devices such as mobile phones. When a mobile phone operating on a first MNO, for example, crosses into an area covered by a second MNO, the second MNO may send configuration commands and/or messages (e.g., provisioning requests) to configure the mobile phone to operate in the area covered by the second MNO. The change in MNO may occur in a given region where the signal quality of the first MNO is weak, but the signal quality of a second MNO in the same region may be better, the mobile phone may attempt to authenticate on the second MNO.

In the case of IoT devices, an IoT device may operate on the AT&T network, for example, with a weak signal quality and may cross into an area where Verizon operates with a strong signal quality. Verizon may send a provisioning request to IoT device 80 to switch only to the Verizon telephone network or to the Verizon IP network individually, resulting in an interruption of service to the other one telephone or internet protocol (IP) networks not specified in the provisioning request.

In some embodiments of the present invention, processor 90 may block the provisioning request to switch only one of the telephone or internet protocol (IP) networks individually, and instead execute a command to switch both of the telephone and internet protocol (IP) networks simultaneously. Blocking the provisioning request may prevent an interruption in service to the other one of the telephone or internet protocol (IP) networks not specified in the provisioning request.

In some embodiments of the present invention. IoT device 80 may be configured to operate in a car in the U.S. to measure vehicle parameters and to send that data to server 20, for example. However, if the same vehicle is sent to another country deployed with the same IoT devices configured for the U.S., the IoT devices may authenticate on an MNO in another country. The foreign MNO may normally send SMS messages, binary SMS messages, and unstructured supplementary service data (USSD) to cellular devices, such as welcome messages, for example, upon roaming into the area serviced by the foreign MNO. However, IoT devices may not be able to process these messages, such as the welcoming messages, rendering the IoT devices inoperable in the new MNO. In this case, processor 90 may be configured to block the SMS messages and USSDs to prevent malfunctioning of the IoT devices.

In some embodiments of the present invention, C_LOGIC 145 may be configured to block or ignore provisioning requests and commands sent to configure IoT device 80 in the new region. Configuration logic to block these requests may be embedded into an MNO profile (e.g., into the virtual SIM) for permitting IoT device 80 to operate in the new region.

Vendors deploying IoT devices for a particular platform may need to test the IoT devices based on a predefined set of tests specific to a particular MNO to ensure that the IoT devices will work properly on the mobile cellular network of the particular MNO. The test routines may simulate a real mobile network. For example, for an IoT device certification to operate on the AT&T cellular network, the device may be required to authenticate on test equipment of a particular test equipment vendor configured with AT&T's MNO profile, for example. One approach is that the test equipment maker supplies test SIM cards with test MNO profile for the MNO-under-test such as AT&T, for example. The IoT device may authenticate with the MNO-configured test equipment, for example, which performs the validation testing. However, test SIM cards are typically very expensive and orders typically take a long time to receive.

In some embodiments of the present invention, connectivity device 100 may be configured with test MNO profiles to mimic test SIM cards for different test equipment vendors and configured to validate IoT devices for different MNOs. With the test MNO profiles pre-stored in connectivity device 100, the IoT device may authenticate with the test equipment configured for a particular MNO profile without the use of the test SIM card supplied by the test equipment vendor so as to certify the IoT device for use by a given mobile network operator.

The test SIM profile may include an inactive subscription for a chosen MNO. If the chosen MNO is, for example, Verizon, the inactive subscription may include Verizon $K_i$ authentication key, and Verizon APN. When the IoT device operates using the chosen MNO test profile in the test equipment, the test equipment may perform encrypt/decrypt commands, requests and data using parameters defined in the inactive subscription associated with the chosen MNO. The test equipment may analyze packet data protocol (PDP) data structures generated with the IoT device using, for example, the Verizon APN settings. In some embodiments, the test equipment may be further configured to toggle between different chosen MNOs (e.g., Verizon, AT&T, T-Mobile, etc.) to validate the IoT device over multiple MNOs in a batch test mode without having to physically switch test SIM cards.

In some embodiments of the present invention, the plurality of MNO profiles includes one or more test SIM profile(s) with an inactive subscription to a chosen MNO, and method 200 may include executing the test SIM profile to cause the virtual SIM to mimic the operation of a test SIM card with the test SIM profile, and validating the communication device on test equipment with communication simulated over the distinct one of the plurality of IP networks associated with the chosen MNO.

Figure 5:
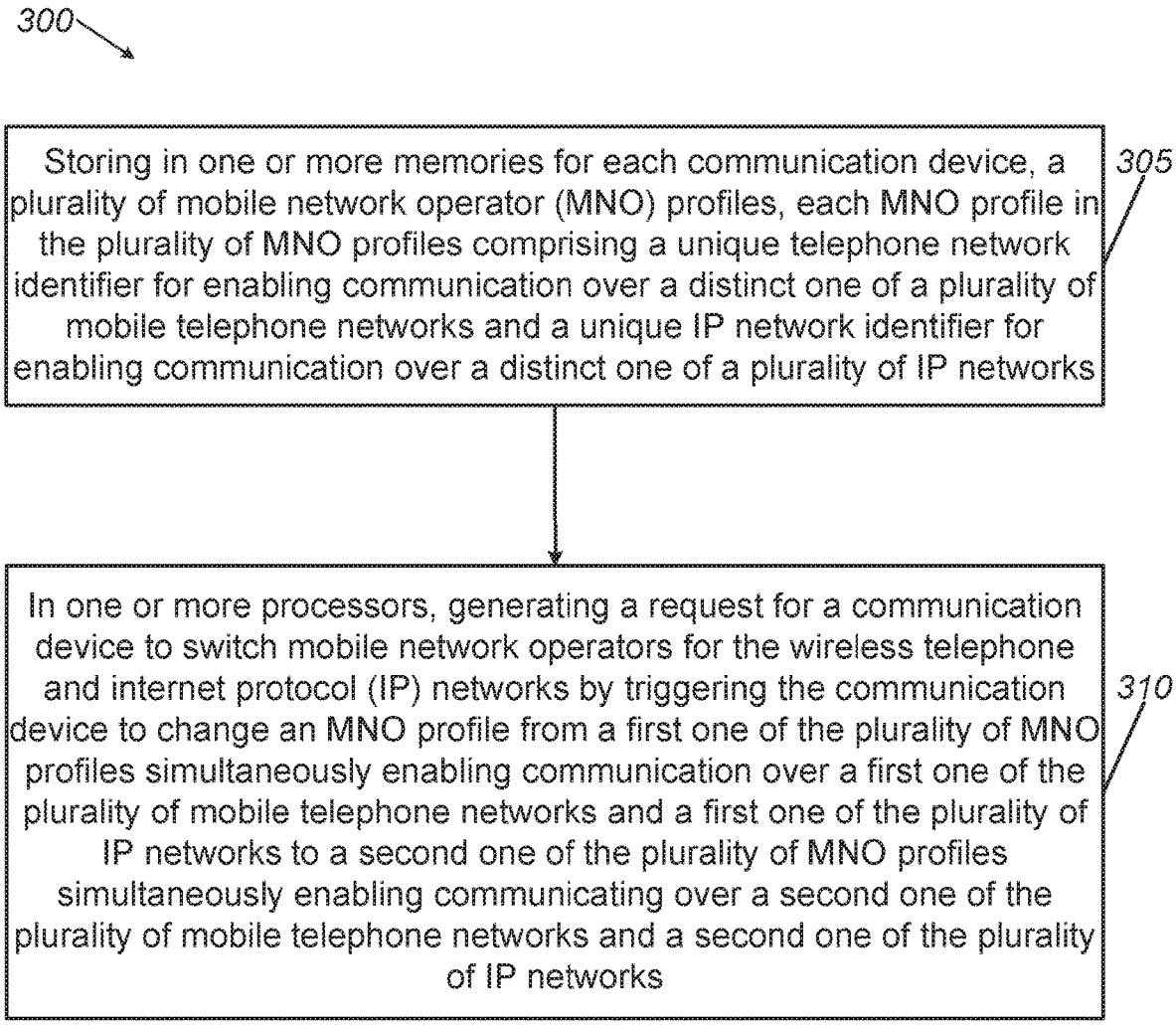
FIG. 5 is a flowchart depicting a method for triggering communication devices to simultaneously switch mobile networks for wireless telephone and internet protocol (IP) networks, in accordance with some embodiments of the present invention.

FIG. 5 is a flowchart depicting a method 300 for triggering communication devices to simultaneously switch mobile networks for wireless telephone and internet protocol (IP) networks, in accordance with some embodiments of the present invention. In the example of FIG. 5, method 300 may be executed by processor 26 of server 20 in system 10 for switching MNO profiles in communication devices 50 over a mobile communication network 35 by a server 20.

Method 300 includes storing 305 in one or more memories for each communication device, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks.

Method 300 includes generating 310 a request for a communication device to switch mobile network operators for the wireless telephone and internet protocol (IP) networks by triggering the communication device to change an MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

In some embodiments of the present invention, method 300 may include sending the request to the communication device to change the MNO profile from the first one of the plurality of MNO profiles to the second one of the plurality of MNO profiles.

In some embodiments of the present invention, method 300 may include determining that the second one of the plurality of telephone or IP networks would provide the communication device with superior connectivity performance than would the first one of the plurality of telephone or IP networks.

In some embodiments of the present invention, method 300 may include sending in the request to the communication device, the second one of the plurality of MNO profiles upon assessing that the second one of the plurality of MNO profiles is not stored in the communication device (e.g., IoT device 50).

In some embodiments of the present invention, method 300 may include encrypting the request using a cryptographic key stored in the one or more memories.

In some embodiments of the present invention, method 300 may include generating the cryptographic key from security unit 32, or secret information associated with the communication device (e.g., IoT device 50) selected from the group consisting of: a soft seed, a hardware identification number, and an algorithm.

In some embodiments of the present invention, method 300 may include decrypting data received from the communication device using a cryptographic security key generated based on a combination of a soft seed derived from a software ID of software (e.g., OS 93) operating in the communication device (e.g., IoT device 50) and a hard seed derived from a hardware ID of the communication device hardware to pair the software and hardware.

In some embodiments of the present invention, the soft seed may be a software ID unique to OS 93 running on the communication device.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A communication device including a virtual subscriber identify module (SIM) configured to operate over multiple wireless telephone and internet protocol (IP) networks, the communication device comprising:

a virtual subscriber identify module (SIM), which mimics the operation of a physical SIM card, wherein the virtual SIM comprises a plurality of mobile network operator (MNO) profiles, each MNO profile in the plurality of MNO profiles comprising a unique telephone network identifier enabling communication over a distinct one of a plurality of mobile telephone networks and a unique IP network identifier enabling communication over a distinct one of a plurality of IP networks; and a processor configured to simultaneously switch mobile network operators for both the wireless telephone and internet protocol (IP) networks by changing MNO profiles from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

2. The communication device according to claim 1, wherein the processor is configured to block a provisioning request to switch only one of the telephone or internet protocol (IP) networks individually, preventing an interruption in service to the other one of the telephone or internet protocol (IP) networks not specified in the provisioning request, and instead self-initiate a command to switch both of the telephone and internet protocol (IP) networks simultaneously.

3. The communication device according to claim 1, wherein the processor is configured to switch mobile network operators in response to receiving a request from a remote server, wherein the processor receives the request in response to the server determining that the second one of the plurality of telephone or IP networks would provide the communication device with superior connectivity performance than would the first one of the plurality of telephone or IP networks.

4. The communication device according to claim 1, wherein the processor is configured to switch mobile network operators in response to receiving a request from a remote server and receive the second one of the plurality of MNO profiles in the request upon assessing that the second one of the plurality of MNO profiles is not stored in the virtual SIM.

5. The communication device according to claim 1, wherein the processor is configured to compare performance of the communication device communicating over the plurality of mobile telephone networks and the plurality of IP networks and to switch mobile network operators upon detecting that the communication device would achieve superior performance operating over the second one of the plurality of MNO profiles than it would operating over the first one of the plurality of MNO profiles.

6. The communication device according to claim 1, wherein the virtual SIM comprises files split between a relatively high security memory and a relatively low security memory, wherein the relatively high security memory is configured for storing private information of the virtual SIM individual to a user or the communication device and the relatively low security memory is configured for storing public information generic across a plurality of virtual SIMs.

7. The communication device according to claim 1, further comprising a physical SIM card, wherein the processor is configured to switch between operating the virtual SIM and physical SIM card for connecting over the multiple wireless telephone and internet protocol (IP) networks.

8. The communication device according to claim 1, wherein the processor is configured to switch between operating the virtual SIM and physical SIM card by using a virtual router.

9. The communication device according to claim 1, wherein the plurality of MNO profiles includes a test SIM profile comprising an inactive subscription to a chosen MNO, which when executed causes the virtual SIM to mimic the operation of a test SIM card with the test SIM profile for validating the communication device on test equipment with communication simulated over the distinct one of the plurality of IP networks associated with the chosen MNO.

10. A server for triggering communication devices to simultaneously switch mobile networks for wireless telephone and internet protocol (IP) networks, the server comprising:

one or more memories configured to store, for each communication device, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks; and one or more processors configured to generate a request for a communication device to switch mobile network operators for the wireless telephone and internet protocol (IP) networks by triggering the communication device to change an MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

11. The server according to claim 10, wherein the one or more processors are configured to determine that the second one of the plurality of telephone or IP networks would provide the communication device with superior connectivity performance than would the first one of the plurality of telephone or IP networks.

12. The server according to claim 10, wherein the one or more processors are configured to send in the request to the communication device, the second one of the plurality of MNO profiles upon assessing that the second one of the plurality of MNO profiles is not stored in the communication device.

13. A method for a communication device with a virtual subscriber identify module (SIM) to operate over multiple wireless telephone and internet protocol (IP) networks, the method comprising:

storing in a virtual SIM, which mimics the operation of a physical SIM card, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks; and in a processor, switching mobile network operators for the wireless telephone and internet protocol (IP) networks by changing the MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

14. The method according to claim 13, further comprising blocking a provisioning request to switch only one of the telephone or internet protocol (IP) networks individually, preventing an interruption in service to the other one of the telephone or internet protocol (IP) networks not specified in the provisioning request, and instead executing a command to switch both of the telephone and internet protocol (IP) networks simultaneously.

15. The method according to claim 13, wherein switching mobile network operators comprises switching mobile network operators in response to receiving a request from a remote server, and wherein receiving the request comprises receiving the request in response to the server determining that the second one of the plurality of telephone or IP networks would provide the communication device with superior connectivity performance than would the first one of the plurality of telephone or IP networks.

16. The method according to claim 13, wherein switching mobile network operators comprises switching mobile network operators in response to receiving a request from a remote server, wherein receiving the request comprises receiving the second one of the plurality of MNO profiles in the request upon assessing that the second one of the plurality of MNO profiles is not stored in the virtual SIM.

17. The method according to claim 13, further comprising comparing performance of the communication device communicating over the plurality of mobile telephone networks and the plurality of IP networks and switching mobile network operators upon detecting that the communication device would achieve superior performance operating over the second one of the plurality of MNO profiles than it would operating over the first one of the plurality of MNO profiles.

18. The method according to claim 13, wherein the virtual SIM comprises files split between a relatively high security memory and a relatively low security memory, wherein the relatively high security memory is configured for storing private information of the virtual SIM individual to a user or the communication device and the relatively low security memory is configured for storing public information generic across a plurality of virtual SIMs.

19. The method according to claim 13, further comprising switching between operating the virtual SIM and a physical SIM card for connecting over the multiple wireless telephone and internet protocol (IP) networks.

20. The method according to claim 19, wherein switching between operating the virtual SIM and physical SIM card comprises using a virtual router.

21. The method according to claim 13, wherein the plurality of MNO profiles includes a test SIM profile with an inactive subscription to a chosen MNO, and further comprising executing the test SIM profile to cause the virtual SIM to mimic the operation of a test SIM card with the test SIM profile and validating the communication device on test equipment with communication simulated over the distinct one of the plurality of IP networks associated with the chosen MNO.

22. A method for triggering communication devices to simultaneously switch mobile networks for wireless telephone and internet protocol (IP) networks, the method comprising:

storing in one or more memories for each communication device, a plurality of mobile network operator (MNO) profiles, each MNO profile in the plurality of MNO profiles comprising a unique telephone network identifier for enabling communication over a distinct one of a plurality of mobile telephone networks and a unique IP network identifier for enabling communication over a distinct one of a plurality of IP networks;

in one or more processors, generating a request for a communication device to switch mobile network operators for the wireless telephone and internet protocol (IP) networks by triggering the communication device to change an MNO profile from a first one of the plurality of MNO profiles simultaneously enabling communication over a first one of the plurality of mobile telephone networks and a first one of the plurality of IP networks to a second one of the plurality of MNO profiles simultaneously enabling communicating over a second one of the plurality of mobile telephone networks and a second one of the plurality of IP networks.

23. The method according to claim 22, further comprising determining that the second one of the plurality of telephone or IP networks would provide the communication device with superior connectivity performance than would the first one of the plurality of telephone or IP networks.

24. The method according to claim 22, further comprising sending in the request to the communication device, the second one of the plurality of MNO profiles upon assessing that the second one of the plurality of MNO profiles is not stored in the communication device.

\* \* \* \* \*